United States Patent
Inman et al.

[11] 3,895,041
[45] July 15, 1975

[54] METALLISED PIGMENTS

[75] Inventors: Eric Richard Inman, Bridge of Weir; James McGeachie McCrae, Stewarton; John Andrew Stirling, Glasgow, all of Scotland

[73] Assignee: Ciba-Geigy Corporation, Ardsley, N.Y.

[22] Filed: Mar. 15, 1973

[21] Appl. No.: 341,415

[30] Foreign Application Priority Data
Mar. 20, 1972 United Kingdom............... 12822/72

[52] U.S. Cl. ...... 260/429.9; 106/288 Q; 260/438.1; 260/439 R; 260/566 F
[51] Int. Cl. ...... C07f 3/06; C07f 13/00; C07f 15/04
[58] Field of Search ......... 260/429.9, 438.1, 439 R, 260/566 F, 288 Q, 439 R

[56] References Cited
UNITED STATES PATENTS

| | | | |
|---|---|---|---|
| 2,847,472 | 8/1958 | Robertson | 260/566 F |
| 2,993,065 | 7/1961 | Kumins et al. | 260/439 R |
| 3,303,162 | 2/1967 | Fuchsman | 260/439 R |
| 3,388,141 | 6/1968 | Berenbaum | 260/439 C |
| 3,440,254 | 4/1969 | Lenoir et al. | 260/429 R |
| 3,457,301 | 7/1969 | Lenoir et al. | 106/288 Q |
| 3,472,876 | 10/1969 | Klein | 260/439 R |
| 3,687,991 | 8/1972 | Gaeng | 260/429.9 |
| 3,700,709 | 10/1972 | Inman et al. | 106/288 Q |
| 3,723,490 | 3/1973 | Inman et al. | 106/288 Q |

FOREIGN PATENTS OR APPLICATIONS
1,075,582 7/1967 United Kingdom
1,297,561 5/1962 France

*Primary Examiner*—Patrick P. Garvin
*Assistant Examiner*—A. P. Demers
*Attorney, Agent, or Firm*—Vincent J. Cavalieri

[57] ABSTRACT

An unsymmetrical compound having either the formula:

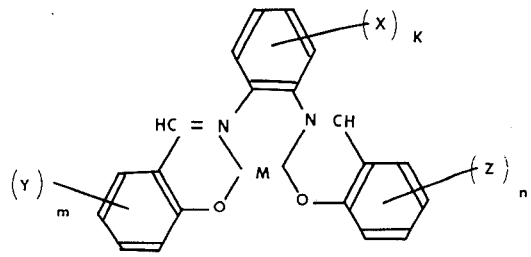

wherein M is a transition metal atom, X and Y are the same or different, and each is hydrogen or each represents a non water solubilising group, and Z has the same significance as X and Y, or two adjacent X groups or two adjacent Y groups or two adjacent Z groups form a fused arylene, and $k$, $m$ and $n$ are the same or different and each is an integer from 1 to 4; or the formula:

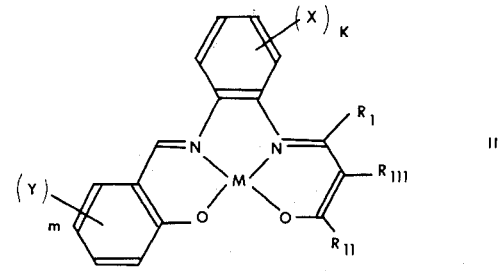

II wherein M, X, Y, $m$ and $k$ have their previous significance, $R_1$ and $R_{11}$ are the same or different and each is an alkyl residue having from 1 to 4 carbon atoms or an aryl residue and $R_{111}$ is hydrogen or an arylazo residue.

13 Claims, No Drawings

METALLISED PIGMENTS

The present invention is concerned with a new class of metallised bisazomethine compounds of value as pigment, and with novel azomethines and bisazomethines of use in the production of these compounds.

The invention provides novel unsymmetrical compounds of formula:

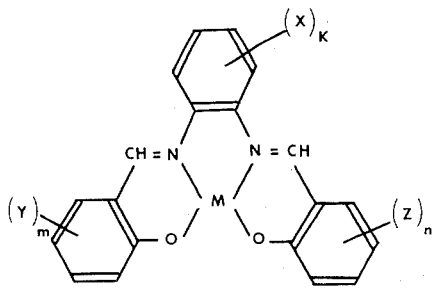

wherein M is a transition metal atom, X and Y are the same or different and each is hydrogen or a non-water solubilising group and Z has the same significance as X and Y, two adjacent X groups or two adjacent Y groups or two adjacent Z groups may form a fused arylene ring, which may itself carry further non-water solubilising substituents, and K, m and n are the same or different and each is an integer from 1 to 4; or

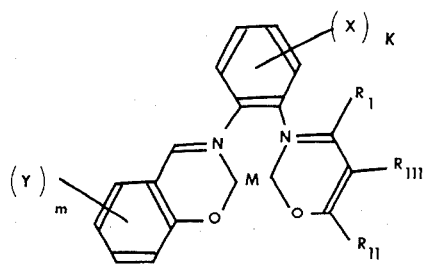

wherein M, X, Y, m and K have their previous significance, $R_1$ and $R_{11}$ are the same or different and each is an alkyl residue having from 1 to 4 carbon atoms or an aryl residue and $R_{111}$ is hydrogen or an arylazo residue.

With regard to the unsymmetrical compounds of formula I, it will be appreciated that when Y and Z are the same and n are the same, then the positions of Y and Z in their respective benzene nuclei are different relative to the respective oxygen atoms attached to these nuclei.

Examples of transition metal atoms which may be present in compounds I and II are members of the first group of transition elements of the Periodic System of Elements such as zinc and especially copper or nickel. Examples of non-water solubilising substituents X, Y and Z include halogen, alkyl and alkoxy groups having from 1 to 4 carbon atoms in the alkyl moiety, nitro and carboxy groups arylazo groups and fused arylene residues.

Although carboxy groups are usually considered to be groups which impart water-solubility to a pigment or dyestuff molecule, in the case of compounds of formula I and II wherein the carboxy group is ortho to the oxygen atom in the naphthylene residue, the carboxy group does not impart any appreciable water-solubility or alkali-sensitivity to the compound of formula I or II.

Examples of aryl substitutents $R_1$ and $R_{11}$ are substituted or unsubstituted phenyl and α- or β-naphthyl residues.

Examples of arylazo residues $R_{111}$ are phenylazo and α- and β-naphthylazo residues optionally substituted by one or more non water-solubilising groups, examples of which are as hereinbefore described.

A preferred sub-group of compounds of the formula I are those having the formula:

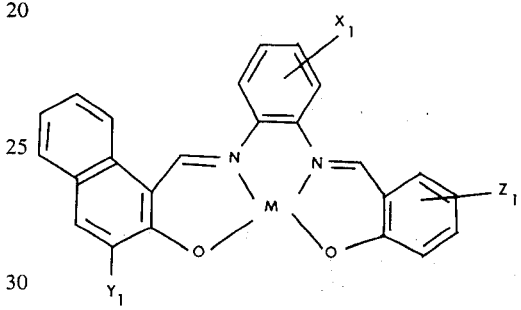

wherein $X_1$, $Y_1$ and $Z_1$ are the same or different and each is a non-water solubilising group.

A preferred instance of the group $X_1$ is a halogen atom, especially a chlorine atom or an alkyl group having from 1 to 4 carbon atoms, especially a methyl group; preferably $Y_1$ is hydrogen or a carboxy group; and preferably $Z_1$ is a halogen atom, especially bromine atom.

A further preferred sub-group of compound of formula I are these having the formula:

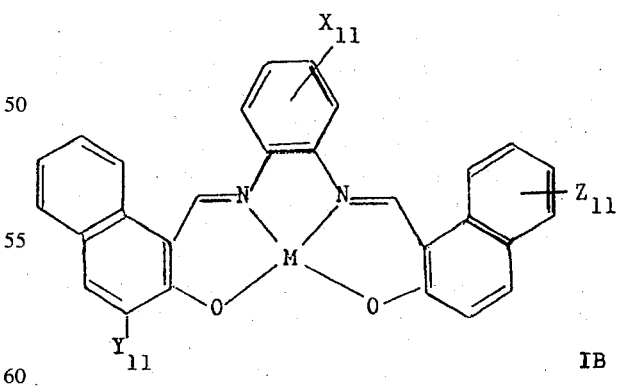

wherein $X_{11}$, $Y_{11}$ and $Z_{11}$ are the same or different and each is a non-water solubilising group.

Preferred instances of group $X_{11}$ are an alkyl group having from 1 to 4 carbon atoms, a nitro group, a halogen atom or a phenoxy group; preferably $Y_{11}$ is hydrogen or a carboxy group; and preferably $Z_{11}$ is hydrogen.

The transition metal complexes of formula I or II are valuable pigments with high fastness properties and many of them, especially the copper and nickel complexes, have adequate durability to enable them to be used effectively in automotive lacquers.

The present invention also provides a first process in which a compound of formula I is produced, comprising reacting a compound having the formula:

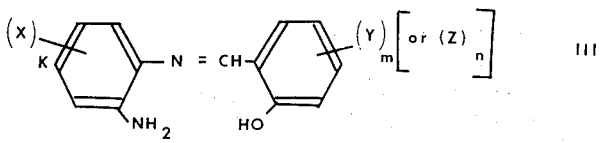

wherein X, Y, Z, K, m and n have their previous significance, with an o-hydroxy aldehyde having the formula:

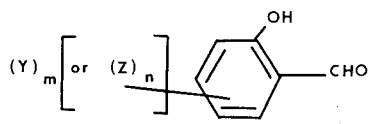

wherein Y, Z, m and n have their previous significance, to produce a compound having the formula:

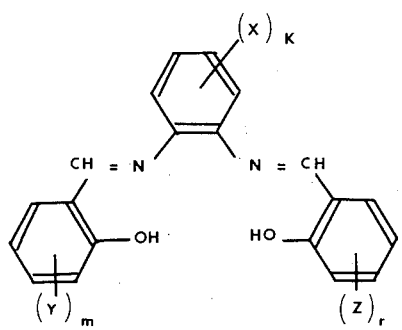

wherein X, Y, Z, K, m and n have their previous significance, and then metallising the reaction product V.

The condensation step of the reaction of compounds III and IV may be effected in solution or in a finely dispersed suspension with good agitation using either water or an organic solvent as the reaction medium. The reaction is conveniently effected at an elevated temperature, usually between 50°C and the reflux temperature depending upon the reactants and the solvent used. Preferably, the progress of the reaction is monitored to ensure that the reaction is proceeding at a satisfactory rate and that the end product is not being rendered impure by side reactions such as disproportionation.

Metallisation of the reaction product V may be carried out in situ, or the reaction product may be filtered off, washed and re-suspended in the same or a different solvent prior to metallisation. Metallisation may be effected using a solution of any soluble transition metal salt. For coppering, an aqueous solution of copper acetate, cuprammonium sulphate or sodium cuprotartrate can be used. In the case of metallisation with zinc, an alcoholic solution of zinc acetate can be used. When metallisation is effected using nickel, it is convenient to use a solution of nickel acetate tetrahydrate in dimethyl formamide.

The compounds of formula III are new and form part of this invention. These compounds may be produced by reacting together the corresponding o-hydroxy aldehyde and o-arylene diamine in solution or as a finely-dispersed suspension, with efficient agitation, in either water or an organic solvent at a reaction temperature below 60°C, preferably at ambient temperature, for sufficient time to enable the reaction to go to completion. The time for completion of the reaction varies from 30 minutes to 4 hours depending upon the nature of the reactants and the conditions employed. It is particularly convenient to carry out the reaction in an aqueous suspension or solution in the presence of a mild reducing agent such as sodium bisulphite for instance in the ratio of 2 mols of bisulphite to 1 mol of aldehyde. In this way the reaction is facilitated and contamination of the product with oxidation products, which would have a deleterious effect on the brightness and other physical properties of the product is avoided. Small amounts that is less than 1% by weight of the calculated weight of the product of a surfactant may be added with advantage when working in an aqueous medium.

Although a variety of organic solvents for instance alcohols, ketones, esters or hydrocarbons may be employed instead of water as the reaction medium, this is less preferred because disproportionation to a mixture of bisazomethine and free o-arylene diamine can occur in organic solvents.

Disproportionation may also occur on heating a solution or suspension of a compound of formula III, or on drying or storing it. For this reason it is particularly advantageous to react them with compounds of formula IV without any further treatment other than filtration and washing.

The compounds of formula V are also new and these compounds also form part of this invention.

According to a further aspect of the present invention there is provided a process in which a compound of formula III as hereinbefore defined is reacted with, respectively, a metal salt of an o-hydroxy aldehyde of formula IV, the salt having the formula:

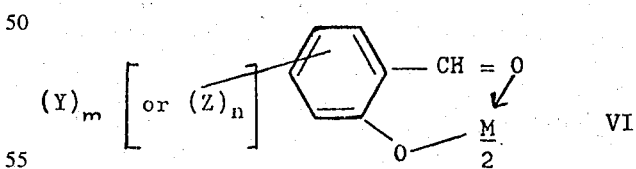

wherein Y, Z, M, m and n have their previous significance, to produce a compound of formula I; or with a metal salt of a corresponding β-diketone, the salt having the formula:

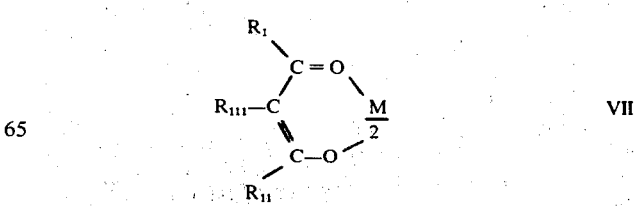

wherein $R_I$, $R_{II}$, $R_{III}$ and M have their previous significance to produce a compound of formula II.

The compounds of formula I and II may be employed as pigments directly after their production according to the process of the invention, that is after they have been filtered off from their reaction mixtures and dried. Alternatively, they may first be further processed using known wet or dry conditioning techniques such as grinding, either alone or in the presence of a water-soluble salt or other medium which can be subsequently be removed, for instance by washing.

Because of their economical and easy mode of production combined with their excellent pigmentary properties, the compounds of formula I and II are valuable as pigments in a wide variety of organic media, for example surface coatings, inks and polymers.

The compounds of formula I and II are valuable pigments which in a finely divided form can be used for pigmenting high molecular organic material, for example cellulose ethers and cellulose esters, such as ethylcellulose, cellulose acetate, cellulose butyrate, polyamides or polyurethanes or polyesters, natural resins or synthetic resins, such as polymerisation resins, for example aminoplasts, especially urea-formaldehyde and melamine-formaldehyde resins, alkyd resins, phenoplasts, polycarbonates, polyolefines, such as polystyrene, polyvinyl chloride, polyethylene polypropylene, polyacrylonitrile, polyacrylic acid esters, rubber, casein, silicone and silicone resins, individually or as mixtures.

At the same time it is immaterial whether the high molecular weight compounds mentioned are in the form of plastic masses, melts or spinning solutions, lacquers, paints or printing inks.

Depending on the end use, it is advantageous to use the new pigments as pure pigment powder or in the form of a dispersion of a pigment in a resin. Resins suitable for use as carriers in pigment dispersions include natural resins, for example abietic acid or its esters, ethylcellulose, cellulose acetobutyrate, alkaline earth salts of higher fatty acids, fatty amines, for example stearylamine or rosin amine, vinyl chloride-vinyl acetate copolymers, polyacrylonitrile or polyterpene resins or water-soluble dyestuffs, for example dyestuffsulphonic acids or their alkaline earth metal salts.

Some Examples will now be given; parts and percentages are expressed by weight unless otherwise stated. Examples 1 to 11 illustrate the production of compounds of formula III; Examples 12 to 20 illustrate the production of compounds of formula V or VII; and Examples 21 to 74 illustrate the production of compounds of formulae I and II.

EXAMPLE 1

10.8 Parts of o-phenylene diamine were stirred in 500 parts of water containing 0.1 parts of a commercial nonionic surfactant using high speed shear agitation at 20°C. 12.2 Parts of salicylaldehyde were added over three hours and the temperature rose to 45°C. Stirring was continued for a further 2 hours and the resultant bright yellow suspension was filtered and the filter-cake was washed with 1,000 parts of water and then air dried. In this way, there were obtained 16.5 parts (78%) of a yellow powder m.p. 65°-6°C having the formula:

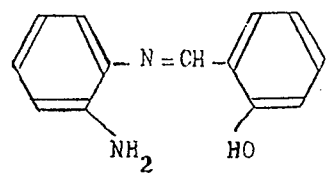

EXAMPLE 2

15.2 Parts of o-vanillin were added to 400 parts of water containing 0.2 parts of commercial nonionic surfactant and the mixture was stirred until a clear solution was obtained. A solution of 10.0 parts of sodium hydroxide in 100 parts of water was added followed by 10.8 parts of o-phenylene diamine and the mixture was then stirred for 15 minutes.

A solution of 30.4 parts of sodium bisulphite in 50 parts of water was added over 10 minutes and the resultant orange-brown suspension was stirred for 1 hour, then filtered and the filter-cake washed with 1,500 parts of water and dried.

There were obtained in this 16.0 parts of an orange-brown solid m.p. 119°-20°C which was free of by-products when examined by thin layer chromatography.

EXAMPLE 3

4.3 Parts of 2-hydroxy-1-naphthaldehyde, 3.83 parts of 3,4-diamino-nitrobenzene were suspended in a mixture of 7.5 parts water, 30 parts acetone and 0.1 parts a commerical nonionic surfactant and the mixture was stirred for 15 minutes. A solution of 1.0 part of sodium hydroxide in 12.5 parts of water was added and the suspension was stirred for a further 15 minutes. 7.6 Parts of sodium bisulphite were added and stirring continued for a further 2 hours. The resultant red-brown suspension was filtered, the filtercake washed with 1,000 parts of water and dried giving 7.0 parts of a brown-red powder.

EXAMPLE 4

86.0 Parts of 2-hydroxy-1-naphthaldehyde and 54.0 parts of o-phenylene diamine were dispersed in 750 parts of water containing 2 parts of a commerical nonionic surfactant by stirring for 15 minutes at room temperature. 20 Parts of sodium hydroxide in 250 parts of water was added to the suspension over one minute to give a thick, bright yellow suspension which was stirred at room temperature for 15 minutes then 76.0 parts of sodium bisulphite were added and stirring continued for 2 hours, then filtered and the filtercake washed with 10,000 parts of water, until the washes were free of sulphate, giving a paste containing 115 parts (88%) of a bright yellow solid. A sample of this paste was dried and found to have a melting-point of 160°-1°C.

EXAMPLE 5

17.2 Parts of 2-hydroxy-1-naphthaldehyde and 10.8 parts of o-phenylene diamine were stirred together at room temperature in 500 parts of ethanol for 3 hours. The resultant orange precipitate was filtered off and the filter-cake washed with 500 parts of ethanol and dried, yielding 24.0 parts (92.0%) of an orange-yellow solid of m.p. 162°-4°C which was identical with the product of Example 4.

EXAMPLE 6

8.6 Parts of 2-hydroxy-1-naphthaldehyde, 5.4 parts of o-phenylene diamine and 60 parts of dioxan were stirred in 15 parts of water which contained 0.1 parts of a commerical nonionic surfactant for 15 minutes. A solution of 2.0 parts of sodium hydroxide dissolved in 25 parts of water was added and after 15 minutes stirring, 7.6 parts of sodium bisulphite was added and stirring continued for a further 90 minutes. The yellow precipitate which formed was filtered, the filtercake washed with 1,000 parts of water and dried, giving 10.5 parts of yellow solid melting at 162°–4°C.

By substituting an equivalent amount of the appropriate diamine and/or o-hydroxy aldehyde in Example 1 the products in the following Table I were obtained. Table I also gives the appropriate yield and melting point of the various products.

Table 1

| Ex. | Diamine | o-hydroxy-aldehyde | Product | Yield % | m.p. |
|---|---|---|---|---|---|
| 7 | 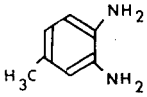 | 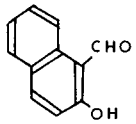 | 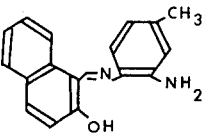 | 90 | 175–90 |
| 8 | 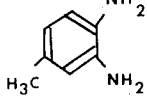 | 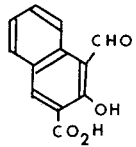 | 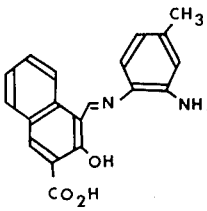 | 96 | 225–55 |
| 9 | 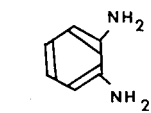 | 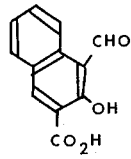 | 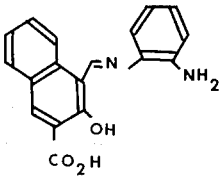 | 80 | 225–35 |
| 10 | 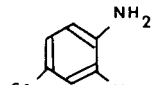 | 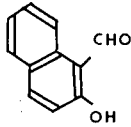 | 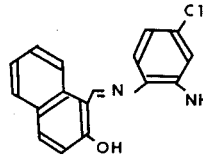 | 88 | 118–20 |
| 11 | 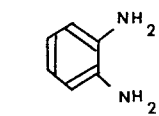 | 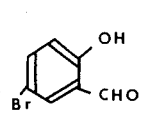 | 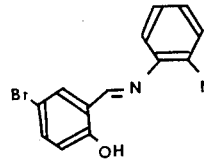 | 81 | 118–20 |

EXAMPLE 12

24.0 Parts of the monoazomethine product of Example 4 and 23.6 parts of 1-formyl-2-hydroxy-3-naphthoic acid were stirred and heated to reflux in 500 parts of ethanol for 2 hours. The resultant orange suspension was filtered, the filter-cake washed with 500 parts of ethanol and dried, producing 27.5 parts of an orange solid m.p. 269°–70°C.

By substituting an equivalent amount of the appropriate monoazomethine and o-hydroxy aldehyde or β-diketone, the products in the following Table II were obtained. Table II also gives the appropriate colour, yield and melting point of the various products.

Table II

| Ex. | Azomethine | o-hydroxyaldehyde or β-diketone | Product | Colour | % Yield | m.p. °C |
|---|---|---|---|---|---|---|
| 13 | (structure) | (structure) | (structure) | Yellow | 60 | 204–5 |
| 14 | " | (structure, Br-substituted) | (structure) | Yellow | 55 | 205–6 |
| 15 | " | (structure, Cl-substituted) | (structure) | Yellow | 87 | 184–6 |
| 16 | " | CH₃COCH₂COCH₃ | (structure) | Yellow | 50 | 220–1 |
| 17 | (structure, CH₃-substituted) | (structure) | (structure) | Orange | 62 | 170–4 |
| 18 | " | (structure, Br-substituted) | (structure) | Yellow | 56 | 190–4 |

Table II — Continued

| Ex. | Azomethine | o-hydroxyaldehyde or β-diketone | Product | Colour | % Yield | m.p. °C |
|---|---|---|---|---|---|---|
| 19 | 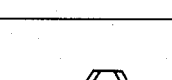 | 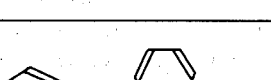 | 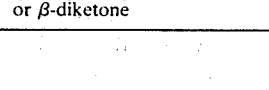 | Orange | 79 | 225–8 |
| 20 | ″ |  | | Red | 50 | 257–60 |

EXAMPLE 21

9.2 Parts of the product of Example 12 were stirred in 250 parts of 2-methoxy ethanol then to this were added 1.96 parts of nickel acetate tetrahydrate dissolved in 50 parts of dimethyl formamide and the mixture was refluxed for 3 hours. The resultant bright red precipitate was filtered, the filter-cake washed with 100 parts of 2-methoxy ethanol followed by 500 parts of ethanol and then dried, giving 8.1 parts (78%) of a deep red solid which did not melt below 360°C.

EXAMPLE 22

6.25 Parts of nickel acetate tetrahydrate were suspended in 100 parts of alcohol and heated to 45°C with heating then 5.0 parts of acetyl acetone in 20 parts of alcohol were added to yield a lime coloured suspension. This suspension was added to 6.55 parts of the product of Example 4 suspended in 100 parts of alcohol. The thick suspension was stirred at room temperature for eight hours to give a bright red suspension which was filtered, washed with 150 parts alcohol and dried at 60°C. Thus was obtained, 10.1 parts (100% yield) of a bright red solid which did not melt below 360°C.

The following Table III gives compounds prepared in a similar manner to that of Example 21. Table III also gives the appropriate ligand, colour in lacquer, yield and a summary of the fastness properties of the various pigments produced.

Table III

| Ex. | Ligand | Product | Colour in Lacquer | % Yield | Fastness to Light |
|---|---|---|---|---|---|
| 23 | | | Red | 89 | Excellent |
| 24 | ″ | | Golden Brown | 82 | Excellent |
| 25 | ″ | | Yellow | 80 | Good |

Table III—Continued

| Ex. | Ligand | Product | Colour in Lacquer | % Yield | Fastness to Light |
|---|---|---|---|---|---|
| 26 | | | Red | 86 | Excellent |
| 27 | | | Golden Brown | 70 | Excellent |
| 28 | | | Red | 80 | Excellent |
| 29 | | | Red | 75 | Excellent |
| 30 | '' | | Orange | 75 | Excellent |
| 31 | '' | | Yellow | 70 | Good |
| 32 | | | Red | 100 | Excellent |
| 33 | '' | | Brown | 92 | Excellent |
| 34 | '' | | Yellow | 70 | Good |

Table III—Continued

| Ex. | Ligand | Product | Colour in Lacquer | % Yield | Fastness to Light |
|---|---|---|---|---|---|
| 35 | | | Orange-brown | 85 | Excellent |
| 36 | " | | Yellow | 90 | Good |
| 37 | | | Red | 92 | Excellent |
| 38 | " | | Orange-brown | 91 | Excellent |
| 39 | " | | Yellow | 72 | Good |
| 40 | | | Red | 93 | Excellent |
| 41 | | | Red | 90 | Excellent |
| 42 | | | Golden brown | 91 | Excellent |
| 43 | " | | Yellow | 90 | Good |
| 44 | | | Red | 85 | Excellent |

Table III—Continued

| Ligand | Product | Colour in Lacquer | % Yield | Fastness to Light |
|---|---|---|---|---|
| " | [Cu complex structure with CH3, CO2H] | Yellow | 90 | Excellent |
| " | [Zn complex structure with CH3, CO2H] | Yellow | 80 | Good |
| [Ligand structure with CH3, OH, CO2H, Br] | [Ni complex structure with CH3, CO2H, Br] | Orange-red | 93 | Excellent |
| " | [Ni-Cu complex structure with CH3, CO2H, Br] | Yellow brown | 94 | Excellent |
| [Ligand structure with CH3, OH, CO2H, Br] | [Zn complex structure with CH3, CO2H, Br] | Yellow | 80 | Good |
| [Ligand with NO2, OH, CO2H] | [Ni complex with NO2, CO2H] | Red | 94 | Excellent |
| " | [Cu complex with NO2, CO2H] | Brown | 70 | Excellent |
| " | [Zn complex with NO2, CO2H] | Red | 80 | Good |
| [Ligand with NO2, OCH3, OH, CO2H, NO2] | [Ni complex with NO2, OCH3, CO2H, NO2] | Brown | 93 | Excellent |

Table III—Continued

| Ex. | Ligand | Product | Colour in Lacquer | % Yield | Fastness to Light |
|---|---|---|---|---|---|
| 54 | " | [structure with Cu, NO₂, OCH₃, CO₂H] | Brown | 90 | Excellent |
| 55 | [structure with NO₂, OCH, OH, CO₂H] | [structure with Zn, NO₂, OCH₃, CO₂H] | Golden yellow | 86 | Good |
| 56 | [structure with OPh, OH, CO₂H] | [structure with OPh, CO₂H] | Red | 98 | Excellent |
| 57 | " | [structure with Cu, OPh, CO₂H] | Golden yellow | 96 | Excellent |
| 58 | " | [structure with Zn, OPh, CO₂H] | Yellow | 82 | Good |
| 59 | [structure with CH₃, OH, CO₂H] | [structure with Ni, CH₃, CO₂H] | Brown | 92 | Excellent |
| 60 | [structure with Cl, OH, CO₂H] | [structure with Cu, Cl, CO₂H] | Brown | 91 | Excellent |
| 61 | [structure with CH₃, OH, CO₂H] | [structure with Ni, CH₃, CO₂H] | Red | 80 | Excellent |

Table III—Continued

| Ex. | Ligand | Product | Colour in Lacquer | % Yield | Fastness to Light |
|---|---|---|---|---|---|
| 62 | " | [Cu complex of naphthaldehyde-phenylenediamine-acetylacetonate with CO₂H] | Golden brown | 75 | Excellent |
| 63 | " | [Zn complex of naphthaldehyde-phenylenediamine-acetylacetonate with CO₂H] | Yellow | 74 | Good |
| 64 | [naphthaldehyde-o-phenylenediamine-acetylacetone ligand] | [Cu complex] | Golden brown | 70 | Excellent |
| 65 | " | [Zn complex] | Yellow | 75 | Good |
| 66 | [5-Cl-salicylaldehyde-o-phenylenediamine-acetylacetone ligand] | [Ni complex] | Red | 85 | Excellent |
| 67 | [5-Br-salicylaldehyde-o-phenylenediamine-acetylacetone ligand] | [Ni complex] | Red | 70 | Excellent |
| 68 | [3-methoxy-salicylaldehyde-o-phenylenediamine-acetylacetone ligand] | [Ni complex] | Brown | 52 | Excellent |
| 69 | [NO₂/OCH₃-substituted diazo-salicylaldehyde-phenylenediamine-acetylacetone ligand] | [Ni complex] | Orange | 65 | Good |

Table III—Continued

| Ex. | Ligand | Product | Colour in Lacquer | % Yield | Fastness to Light |
|---|---|---|---|---|---|
| 70 | | | Red | 51 | Good |
| 71 | | | Red | 100 | Good |
| 72 | | | Red | 100 | Good |
| 73 | " | 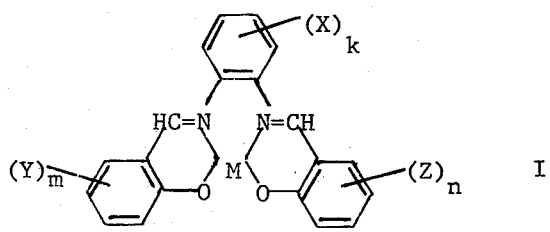 | Brown | 97 | Good |

EXAMPLE 74

60 Parts of the product of Example 21 were ball milled with 138 parts of a solution of an unmodified butylated melamine/formaldehyde resin in n-butanol and 452 parts of xylol. 350 parts of a solution of a hydroxy acrylic resin, a 1:1 mixture of xylene and n-butanol, were added gradually and ball milling continued. The resulting mixture had a pigment to binder ratio of 1:5; this was adjusted to 1:10 by the addition of more resin solution and the paint was thinned to the required viscosity for spraying. Aluminium panels were sprayed and then stoved at 120°C for 30 minutes. The resulting paint films had excellent fastness to light, heat and acids; for example, spotting the panels with 0.1 N hydrochloric acid left no discolouration after drying, and stoving the panels at 180°C for 30 minutes had practically no detectable effect on the colour. The resulting coated panels were a very attractive transparent red colour and could be oversprayed with for example, a white paint of the same type without the red colour bleeding into and thus spoiling the new white finish.

When the stainer (with a 1:5 pigment to binder ratio) whose preparation is described above was combined with a suitable paste of finely powdered aluminium to give a pigment to aluminium ratio of 75:25 and the mixture was again thinned to a suitable viscosity for spraying, very atractive bronze yellow metallic coatings were obtained which also had excellent fastness properties.

In the same way by replacing the product of Example 21 with the products of any of the Examples 22–73 there could be obtained paint films having varying shades of yellow to red. All were however, characterized by having the same excellent fastness properties.

We claim:

1. An unsymmetrical compound having either the formula:

I wherein M is Cu, Ni or Zn, X and Y are the same or different, and each is hydrogen or each represents a non water solubilising group, selected from the group consisting of halogen, alkyl having from 1 to 4 carbon atoms, alkoxy having from 1 to 4 carbon atoms, nitro, or carboxy, and Z has the same significance as X and Y, or two adjacent X groups or two adjacent Y groups or two adjacent Z groups form a fused naphthalene ring, and $k$, $m$ and $n$ are the same or different and each is an integer from 1 to 4 with the proviso that when Y, Z are the same, then the positions of Y and Z in their respective benzene nuclei are different relative to the respective oxygen atoms attached to these nuclei; or the formula:

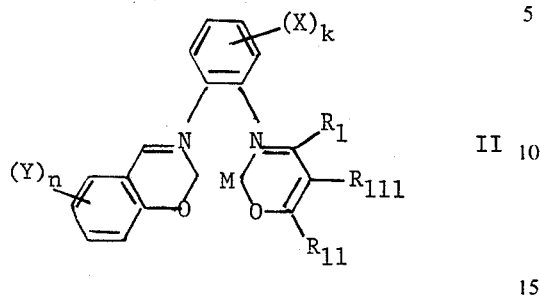

II wherein M, X, Y, $m$ and $k$ have their previous significance, $R_1$ and $R_{11}$ are the same or different and each is an alkyl having from 1 to 4 carbon atoms or an aryl selected from the group consisting of phenyl, $\alpha$-naphthyl and $\beta$-naphthyl, and $R_{111}$ is hydrogen or an arylazo selected from the groups consisting of phenylazo, $\alpha$-naphthylazo and $\beta$-naphthylazo.

2. A compound as claimed in claim 1, wherein M is a copper or nickel.

3. A compound as claimed in claim 1, wherein X, Y and Z are non water solubilising groups selected from halogen, alkyl having from 1 to 4 carbon atoms, alkoxy having from 1 to 4 carbon atoms, nitro, carboxy or form a naphthylene ring with the group to which they are attached.

4. A compound of formula II according to claim 1 wherein $R_{111}$ is hydrogen.

5. A compound according to claim 1 having the formula:

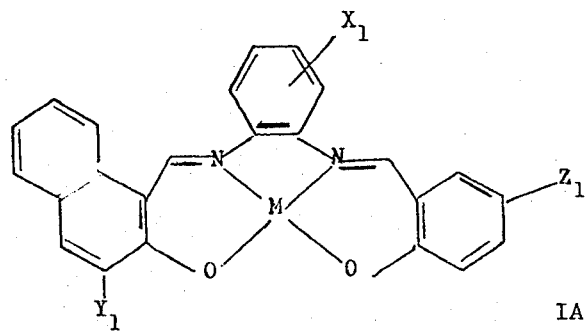

IA wherein $X_1$ is a halogen or alkyl having 1 to 4 carbon atoms, $Y_1$ is hydrogen or carboxyl and $Z_1$ is hydrogen, phenylazo or halogen.

6. A compound as claimed in claim 1 and having the formula:

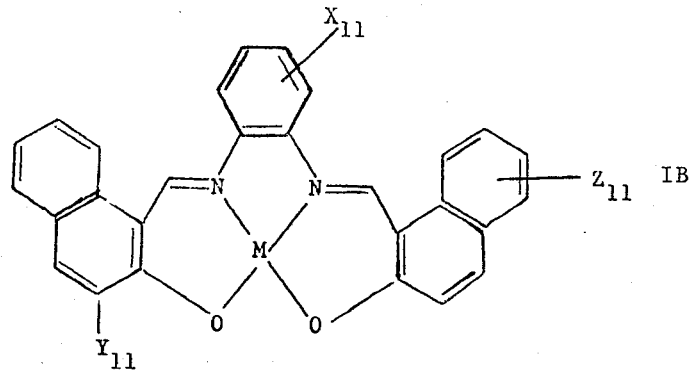

IB wherein $X_{11}$ is an alkyl having from 1 to 4 carbon atoms, a nitro, halogen or phenoxy, $Y_{11}$ is hydrogen or carboxy and wherein $Z_{11}$ is hydrogen.

7. A process of producing a compound of the formula:

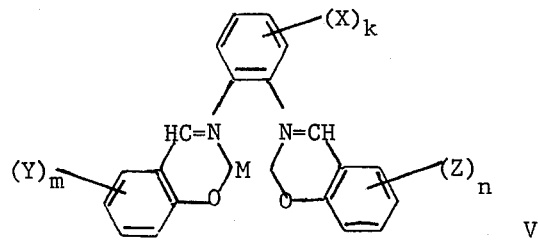

V wherein M is Cu, Ni or Zn, X and Y are the same or different, and each is hydrogen or each represents a non water solubilising group selected from the group consisting of halogen, alkyl of 1 to 4 carbon atoms, alkoxy of 1 to 4 carbon atoms, nitro, or carboxy and Z has the same significance as X and Y, or two adjacent X groups or two adjacent Y groups or two adjacent Z groups form a fused naphthylene ring, and $k$, $m$ and $n$ are the same or different and each is an integer from 1 to 4 with the proviso that when Y, Z are the same, then the positions of Y and Z in their respective benzene nuclei are different relative to the respective oxygen atoms attached to these nuclei; comprising reacting a compound having the formula:

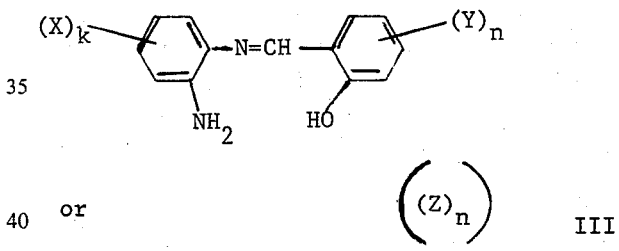

III with an o-hydroxy aldehyde having the formula:

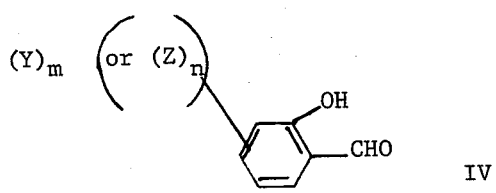

IV to produce a compound having the formula:

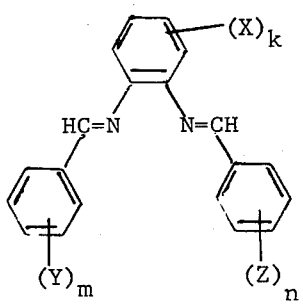

and then metallising the compound V.

8. A process as claimed in claim 7, wherein the reaction between compounds III and IV is effected in solution or in a finely-dispersed suspension with good agitation, using water as the reaction medium.

9. A process as claimed in claim 7, wherein the reaction between the compounds III and IV is effected at a temperature between 50°C. and the reflux temperature of the mixture.

10. A process as claimed in claim 7, wherein the metallisation of compound V is carried out in situ or the compound V is filtered off, washed and resuspended in the same or a different solvent prior to metallisation.

11. A process as claimed in claim 7, wherein an aqueous solution of copper acetate, cuprammonium sulphate or sodium cuprotartrate is used for metallisation.

12. A process as claimed in claim 7, wherein a solution of nickel acetate tetrahydrate in dimethyl formamide is used for metallisation.

13. A process for the production of a compound of formula I or II comprising reacting a compound of formula III as defined in claim 7 with, respectively, a metal salt of an o-hydroxy aldehyde of formula IV as defined in claim 7, the salt having the formula:

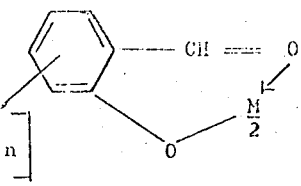

wherein Y, Z, M, m and n are as defined in claim 1, to produce a compound of formula I; or with a metal salt of a corresponding $\beta$-diketone, the salt having the formula:

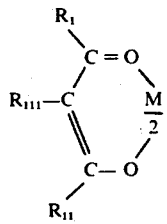

* * * * *